(12) United States Patent
Wu et al.

(10) Patent No.: US 10,749,712 B2
(45) Date of Patent: Aug. 18, 2020

(54) DEVICE AND METHOD OF PERFORMING BANDWIDTH DETECTION

(71) Applicant: Realtek Semiconductor Corp., HsinChu (TW)

(72) Inventors: Cheng-Jung Wu, Kaohsiung (TW);
Yi-Syun Yang, Kinmen County (TW);
Chung-Yao Chang, Hsinchu County (TW)

(73) Assignee: Realtek Semiconductor Corp., HsinChu (TW)

( * ) Notice: Subject to any disclaimer, the term of this patent is extended or adjusted under 35 U.S.C. 154(b) by 0 days.

(21) Appl. No.: 16/407,121

(22) Filed: May 8, 2019

(65) Prior Publication Data

US 2020/0076646 A1 Mar. 5, 2020

(30) Foreign Application Priority Data

Sep. 4, 2018 (TW) .............................. 107130945 A

(51) Int. Cl.
*H03D 1/00* (2006.01)
*H04L 27/06* (2006.01)
*H04L 25/02* (2006.01)
*H04B 17/336* (2015.01)
*H04B 17/21* (2015.01)
*H04L 25/03* (2006.01)

(52) U.S. Cl.
CPC .......... *H04L 25/022* (2013.01); *H04B 17/21* (2015.01); *H04B 17/336* (2015.01); *H04L 25/0222* (2013.01); *H04L 25/03006* (2013.01); *H04L 2025/0349* (2013.01)

(58) Field of Classification Search
CPC ............... H04L 25/022; H04L 25/0222; H04L 25/03006; H04L 2025/0349; H04L 27/2647; H04B 17/336; H04B 17/21; H04B 1/7093; H04W 52/0206
USPC ................................ 375/350, 342, 343, 362
See application file for complete search history.

(56) References Cited

U.S. PATENT DOCUMENTS

| 4,985,899 A | 1/1991 | Walsh | |
|---|---|---|---|
| 2006/0182168 A1* | 8/2006 | Wang | H04B 1/7093 375/143 |
| 2008/0273633 A1* | 11/2008 | Conrad | H04L 27/2647 375/343 |
| 2016/0081089 A1* | 3/2016 | Suzuki | H04W 52/0206 370/343 |

* cited by examiner

*Primary Examiner* — Phuong Phu
(74) *Attorney, Agent, or Firm* — Winston Hsu

(57) ABSTRACT

A bandwidth detection device comprises a receiving circuit, for receiving a first plurality of frequency-domain signals on a first subchannel; a filter circuit, coupled to the receiving circuit, for transferring the first plurality of frequency-domain signals to a first plurality of filtered frequency-domain signals according to a filter function; and a processing circuit, coupled to the filter circuit, for comparing the first plurality of frequency-domain signals with the first plurality of filtered frequency-domain signals, to determine whether the first subchannel comprises first transmitted data.

9 Claims, 5 Drawing Sheets

DEVICE AND METHOD OF PERFORMING BANDWIDTH DETECTION

BACKGROUND OF THE INVENTION

1. Field of the Invention

The present invention relates to a device and a method used in a communication system, and more particularly, to a device and a method of performing bandwidth detection.

2. Description of the Prior Art

In a communication system, a receiver performs a bandwidth detection to obtain bandwidth information, when it is unknown on which subchannel a transmitter transmits signals. After obtaining the bandwidth information, the receiver may process the signals early, to improve a signal quality and performance of the receiver. In general, the receiver performs the bandwidth detection by utilizing a correlation operation or a matched filter. However, in an environment with a low signal-to-noise ratio (SNR) or a high interference, it is difficult to obtain the bandwidth information with a high accuracy according to the correlation operation and the matched filter. Thus, how to obtain the bandwidth information with a high accuracy in the environment with the low SNR or the high interference is an important problem to be solved.

SUMMARY OF THE INVENTION

The present invention therefore provides a bandwidth detection device for performing bandwidth detection to solve the abovementioned problem.

A bandwidth detection device comprises a receiving circuit, for receiving a first plurality of frequency-domain signals on a first subchannel; a filter circuit, coupled to the receiving circuit, for transferring the first plurality of frequency-domain signals to a first plurality of filtered frequency-domain signals according to a filter function; and a processing circuit, coupled to the filter circuit, for comparing the first plurality of frequency-domain signals with the first plurality of filtered frequency-domain signals, to determine whether the first subchannel comprises first transmitted data.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
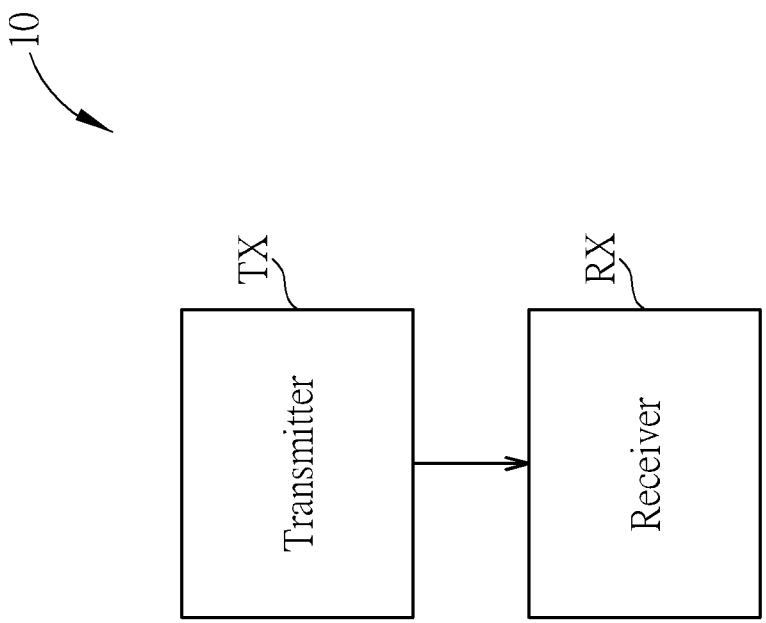
FIG. 1 is a schematic diagram of a communication system according to an example of the present invention.

FIG. 1 is a schematic diagram of a communication system 10 according to an example of the present invention. The communication system 10 may be any communication system using an orthogonal frequency-division multiplexing (OFDM) technique (or termed as discrete multi-tone modulation (DMT) technique), and is briefly composed of a transmitter TX and a receiver RX. In FIG. 1, the transmitter TX and the receiver RX are simply utilized for illustrating the structure of the communication system 10. For example, the communication system 10 may be any wired communication system such as an asymmetric digital subscriber line (ADSL) system, a power line communication (PLC) system or an Ethernet over coax (EOC), or may be any wireless communication system such as a wireless local area network (WLAN), a Digital Video Broadcasting (DVB) system, a Long Term Evolution (LTE) system, a Long Term Evolution-advanced (LTE-A) system or a fifth generation (5G) system. In addition, the transmitter TX and the receiver RX may be installed in a mobile phone, a laptop, etc., but is not limited herein.

Figure 2:
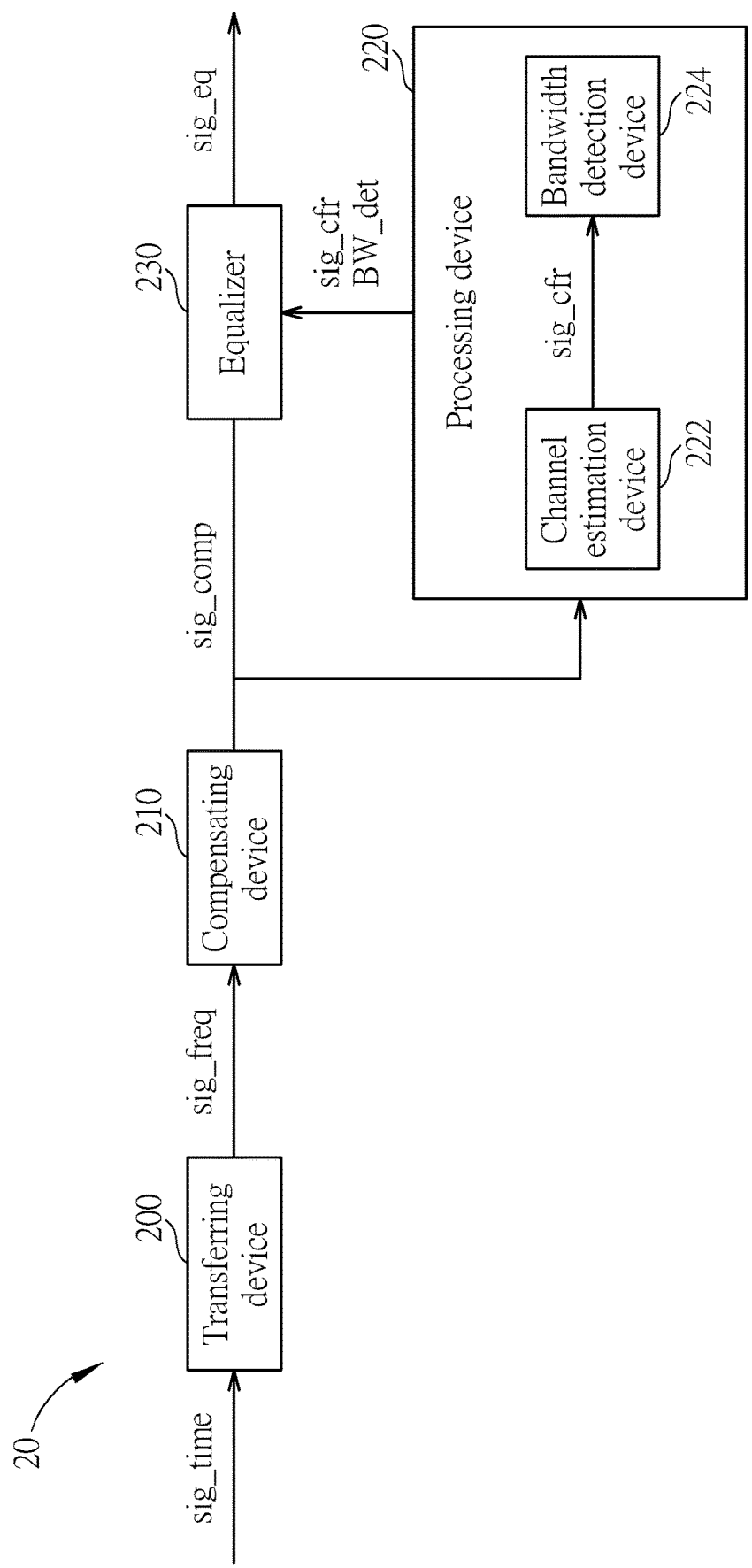
FIG. 2 is a schematic diagram of a receiving device according to an example of the present invention.

FIG. 2 is a schematic diagram of a receiving device 20 according to an example of the present invention. The receiving device 20 may be utilized in the receiver RX of FIG. 1, for processing signals transmitted by the transmitter TX. The receiving device 20 includes a transferring device 200, a compensating device 210, a processing device 220 and an equalizer 230. In detail, the transferring device 200 transfers a plurality of time-domain signals sig_time to a plurality of frequency-domain signals sig_freq, after the receiving device 20 receives the plurality of time-domain signals sig_time, wherein the plurality of frequency-domain signals sig_freq are transmitted on a plurality of subchannels. The compensating device 210 is coupled to the transferring device 200, for performing a time compensation and/or a frequency compensation on the plurality of frequency-domain signals sig_freq to generate a plurality of compensated signals sig_comp. The processing device 220 is coupled to the compensating device 210, for generating a plurality of channel frequency responses sig_cfr and a plurality of bandwidth detection results BW_det according to the plurality of compensated signals sig_comp. The equalizer 230 is coupled to the compensating device 210 and the processing device 220, for performing an equalization on the plurality of compensated signals sig_comp according to the plurality of channel frequency responses sig_cfr and the plurality of bandwidth detection results BW_det, to generate a plurality of equalized signals sig_eq.

In one example, the processing device 220 includes a channel estimation device 222 and a bandwidth detection device 224. The channel estimation device 222 generates the plurality of channel frequency responses sig_cfr according to the plurality of compensated signals sig_comp. The bandwidth detection device 224 is coupled to the channel estimation device 222, for generating the plurality of bandwidth detection results BW_det according to the plurality of channel frequency responses sig_cfr.

In one example, the plurality of time-domain signals sig_time are included in at least one packet. In one example, the at least one packet includes a Legacy Preamble and a non-Legacy Preamble. In one example, the Legacy Preamble includes a Legacy Short Training Field (L-STF), a Legacy Long Training Field (L-LTF) and a Legacy Signal Field (L-SIG). In one example, the non-Legacy Preamble is a High Throughput Preamble including a High Throughput Signal Field. In one example, the non-Legacy Preamble is a Very High Throughput Preamble including a Very High Throughput Signal Field A. In one example, the non-Legacy Preamble is a High Efficiency Preamble including a High Efficiency Signal Field A. In one example, the High Throughput Signal Field, the High Throughput Signal Field A and/or the High Efficiency Signal Field A include bandwidth information. In the prior art, according to the bandwidth information in the High Throughput Signal Field, the High Throughput Signal Field A and/or the High Efficiency Signal Field A, the receiver RX knows on which subchannel(s) of the plurality of subchannels transmitted data is transmitted. According to the present invention, the receiver RX knows earlier on which subchannel(s) of the plurality of subchannels the transmitted data is transmitted, by performing a bandwidth detection to generate the plurality of bandwidth detection results BW_det. That is, a first time instant of generating the plurality of bandwidth detection results BW_det according to the present invention is earlier than a second time instant of obtaining the bandwidth information in the prior art. In one example, the plurality of time-domain signals sig_time are L-LTFs.

Figure 3:
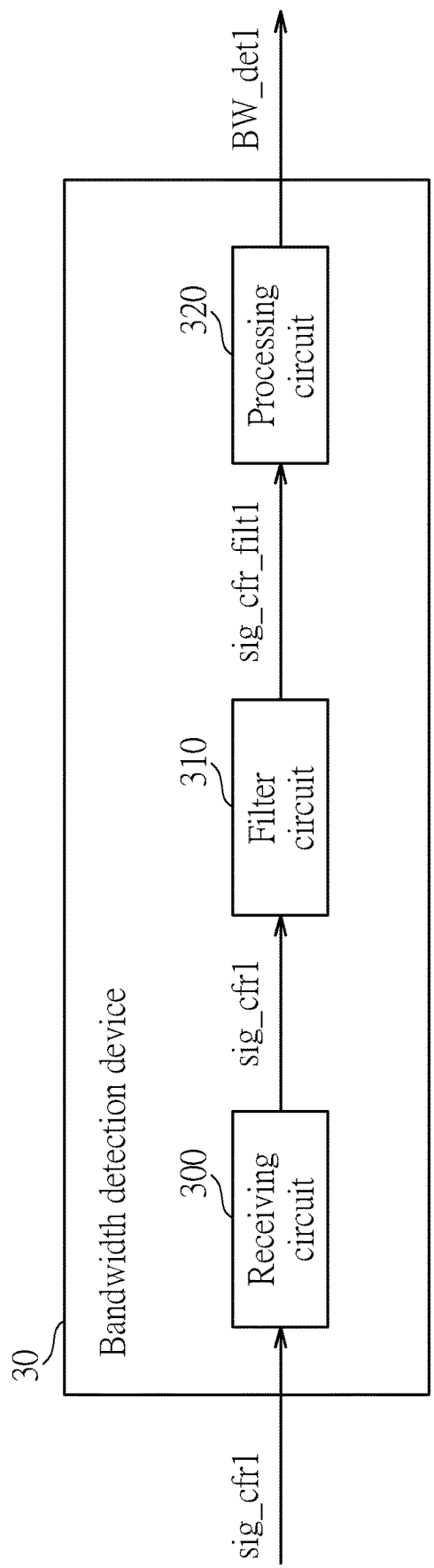
FIG. 3 is a schematic diagram of a bandwidth detection device according to an example of the present invention.

FIG. 3 is a schematic diagram of a bandwidth detection device 30 according to an example of the present invention. The bandwidth detection device 30 may be utilized in the bandwidth detection device 224 of FIG. 2, but is not limited herein. The bandwidth detection device 30 includes a receiving circuit 300, a filter circuit 310 and a processing circuit 320. The receiving circuit 300 receives a first plurality of channel frequency responses sig_cfr1 on a first subchannel. The filter circuit 310 is coupled to the receiving circuit 300, for transferring the first plurality of channel frequency responses sig_cfr1 to a first plurality of filtered channel frequency responses sig_cfr_filt1 according to a filter function. The processing circuit 320 is coupled to the filter circuit 310, for comparing the first plurality of channel frequency responses sig_cfr1 with the first plurality of filtered channel frequency responses sig_cfr_filt1, to determine whether the first subchannel includes first transmitted data. The processing circuit 320 generates a first bandwidth detection result BW_det1 according to the determination. The first bandwidth detection result BW_det1 is included in the plurality of bandwidth detection results BW_det.

In one example, the receiving circuit 300 receives a second plurality of channel frequency responses sig_cfr2 on a second subchannel. The second plurality of channel frequency responses sig_cfr2 is included in the plurality of channel frequency responses sig_cfr. The filter circuit 310 transfers the second plurality of channel frequency responses sig_cfr2 to a second plurality of filtered channel frequency responses sig_cfr_filt2 according to the filter function. The processing circuit 320 compares the second plurality of channel frequency responses sig_cfr2 with the second plurality of filtered channel frequency responses sig_cfr_filt2, to determine whether the second subchannel includes second transmitted data. The processing circuit 320 generates a second bandwidth detection result BW_det2 according to the determination. The second bandwidth detection result BW_det2 is included in the plurality of bandwidth detection results BW_det.

In one example, the processing circuit 320 determines that the first subchannel includes the plurality of time-domain signals sig_time, when a ratio of a total energy level of the first plurality of channel frequency responses sig_cfr1 and a total energy level of the first plurality of filtered channel frequency responses sig_cfr_filt1 is not greater than a threshold. In one example, the processing circuit 320 determines that the first subchannel does not include the plurality of time-domain signals sig_time, when the ratio is greater than the threshold.

In one example, the first plurality of channel frequency responses sig_cfr1 are located in a L-STF, a L-LTF or a L-SIG. In one example, the first subchannel occupies a bandwidth. In one example, the first plurality of channel frequency responses sig_cfr1 include a plurality of channel estimates of the first subchannel. In one example, the second plurality of channel frequency responses sig_cfr2 include a plurality of channel estimates of the second subchannel.

In one example, the filter function is a uniform smoothing filter or an exponential smoothing filter. In one example, the filter function is a third-order filter function. In one example, the filter function is not related to a signal-to-noise ratio (SNR). For example, coefficient(s) of the filter function may be coefficient(s) of SNR below 60 dB (e.g., 40 dB or 0 dB). In one example, all coefficient (s) of the filter function are real numbers. Thus, the filter circuit 310 reduces complexity and power of the operation.

The following example is used for illustrating how to determine on which subchannel (s) of the plurality of subchannels the transmitted data is. First, a L-LTF includes two identical time-domain transmitted sequences $L_1$ and $L_2$ in the time domain, and the receiving device 20 correspondingly receives time-domain received sequences $r_{L_1}$ and $r_{L_2}$ (i.e., the plurality of time-domain signals sig_time). The transferring device 200 transfers the time-domain received sequences $r_{L_1}$ and $r_{L_2}$ to frequency-domain received sequences $R_{L_1}^m$ and $R_{L_2}^m$, respectively, as follows:

$$R_{L_1}^m = DFT(r_{L_1}), R_{L_2}^m = DFT(r_{L_2}) \qquad \text{(Eq.1)}$$

where m is an index of a subchannel, and m=0, 1, ..., M−1. M is the number of the subchannels. In one example, taking a WLAN system as an example, the total bandwidth is 160 MHz, which can be divided into eight 20 MHz-subchannels (i.e., M=8). In one example, 1≤M≤8. Then, after the compensating device 210 compensates the frequency-domain received sequences $R_{L_1}^m$ and $R_{L_2}^m$, the channel estimation device 222 averages the frequency-domain received sequences $R_{L_1}^m$ and $R_{L_2}^m$, to obtain an average sequence $R_{L_{12}}^m$ as follows:

$$R_{L_{12}}^m = \left[ \frac{R_{L_1}^m + R_{L_2}^m}{2} \right] \qquad \text{(Eq. 2)}$$

According to the average sequence $R_{L_{12}}^m$, the channel estimation device 222 generates a channel frequency response $H_{LS,k}^m$ (e.g., the first plurality of channel frequency responses sig_cfr1 or the second plurality of channel frequency responses sig_cfr2) as follows:

$$H_{LS,k}^m = R_{L_{12},k}^m X_{L_0,k} \qquad \text{(Eq.3)}$$

where k is an index of a subcarrier, and k=0, 1, ..., K−1. K is the number of the subcarriers. In one example, K=52. In addition, $X_{L_0,k}$ is a result of the time-domain transmitted sequences $L_1$ and $L_2$ transferred into frequency-domain sequences. The channel frequency response $H_{LS,k}^m$ is a least square (LS) solution. According to the channel frequency response $H_{LS,k}^m$, the bandwidth detection device 224 (or the bandwidth detection device 30) generates a filtered channel frequency response $H_{SM,k}^m$ (e.g., the first plurality of filtered channel frequency responses sig_cfr_filt1 or the second plurality of filtered channel frequency responses sig_cfr_filt2) as follows:

$$H_{SM,k}^m = \sum_{l=0}^{L-1} H_{LS,k-l}^m G_l \qquad \text{(Eq.4)}$$

where $G_l$ is a coefficient of the filter function, and L is the number of the coefficients. The filter function is a smoothing filter. Then, the bandwidth detection device 224 calculates total energy levels $P_{LS}^m$ and $P_{SM}^m$ of the channel frequency response $H_{LS,k}^m$ and the filtered channel frequency response $H_{SM,k}^m$ as follows:

$$P_{LS}^m = \Sigma_{k=0}^{K-1} |H_{LS,k}^m|^2 \quad \text{(Eq.5)}$$

$$P_{SM}^m = \Sigma_{k=0}^{K-1} |H_{SM,k}^m|^2 \quad \text{(Eq.6)}$$

The bandwidth detection device 224 compares the total energy level $P_{LS}^m$ with the total energy level $P_{SM}^m$. If a ratio of the total energy levels $P_{LS}^m$ and $P_{SM}^m$ is not greater than a threshold THD, the bandwidth detection device 224 determines that the subchannel with the index m includes the time-domain received sequences $r_{L_1}$ and $r_{L_2}$, as described by (Eq.7):

$$\frac{P_{LS}^m}{P_{SM}^m} \leq THD \quad \text{(Eq. 7)}$$

If the ratio of the total energy levels $P_{LS}^m$ and $P_{SM}^m$ is greater than the threshold THD, the bandwidth detection device 224 determines that the subchannel with the index m does not include the time-domain received sequences $r_{L_1}$ and $r_{L_2}$, as described by (Eq.8):

$$\frac{P_{LS}^m}{P_{SM}^m} > THD \quad \text{(Eq. 8)}$$

Figure 4:
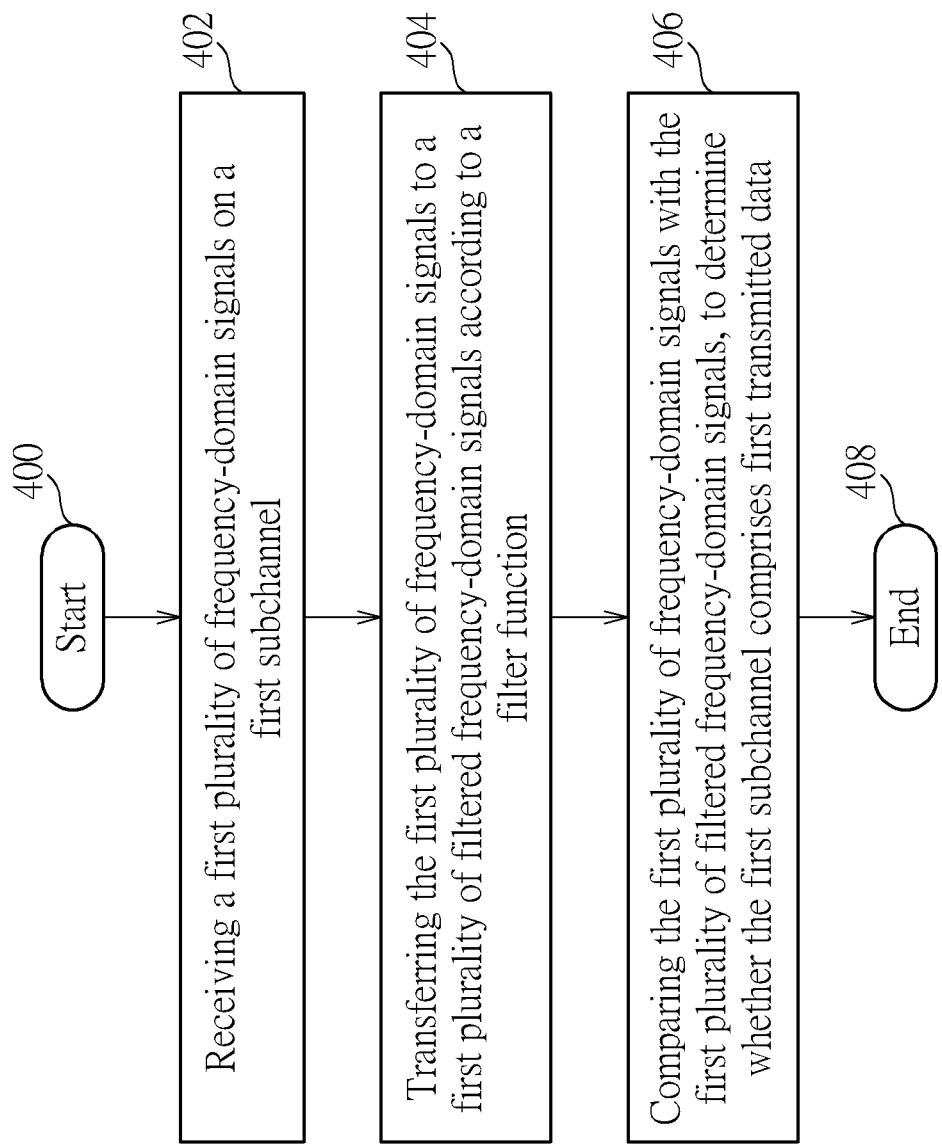
FIG. 4 is a flowchart of a process according to an example of the present invention.

Operations of the bandwidth detection device 30 in the above examples can be summarized into a process 40 shown in FIG. 4. The process 40 is utilized in the bandwidth detection device 224, and includes the following steps:

Step 400: Start.

Step 402: Receiving a first plurality of frequency-domain signals on a first subchannel.

Step 404: Transferring the first plurality of frequency-domain signals to a first plurality of filtered frequency-domain signals according to a filter function.

Step 406: Comparing the first plurality of frequency-domain signals with the first plurality of filtered frequency-domain signals, to determine whether the first subchannel comprises first transmitted data.

Step 408: End.

The process 40 is used for illustrating the operations of the bandwidth detection device 30. Detailed description and variations of the process 40 can be referred to the previous description, and are not narrated herein.

Figure 5:
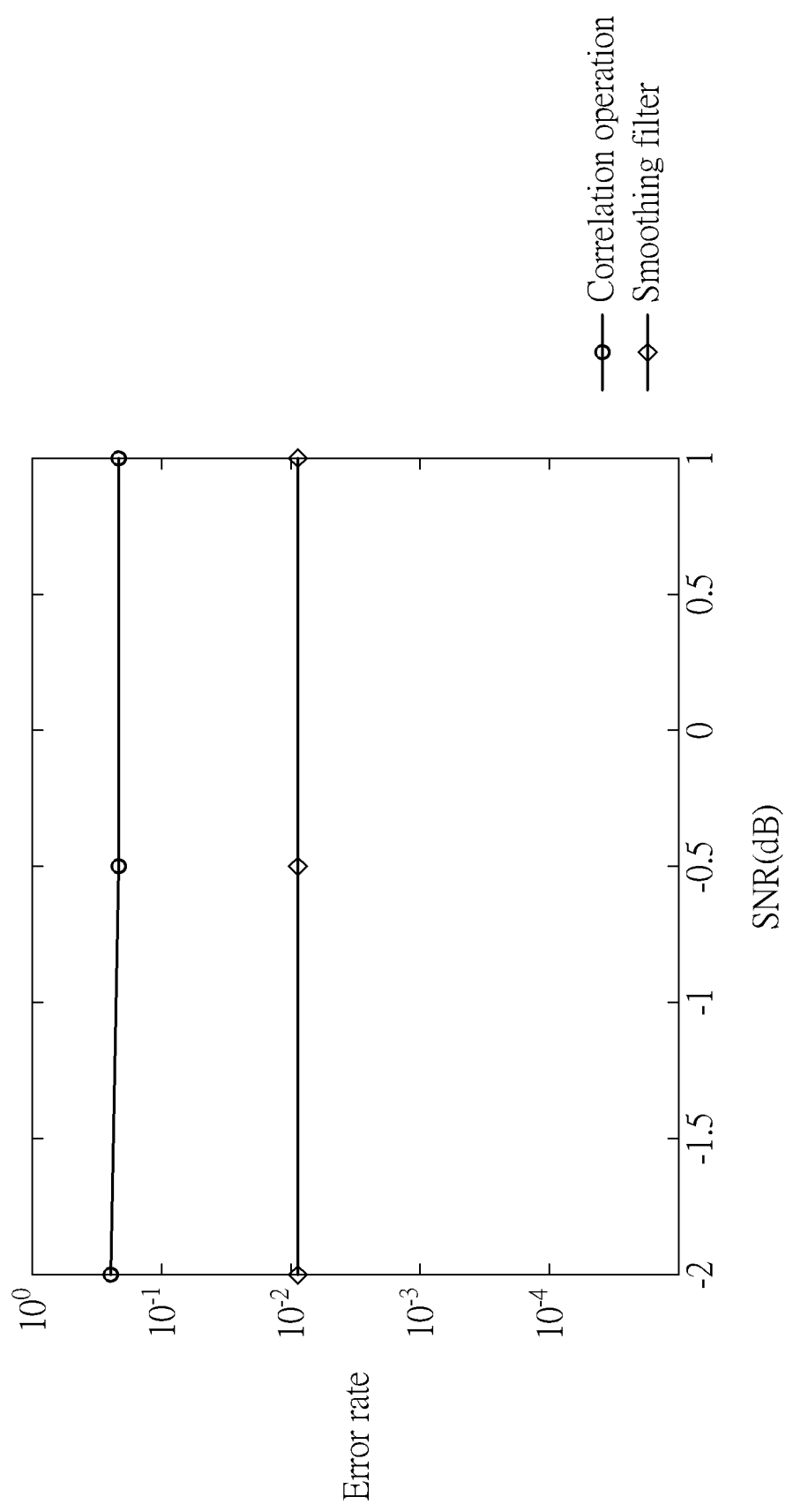
FIG. 5 is a simulation result according to an example of the present invention.

FIG. 5 is a simulation result according to an example of the present invention. Simulation environment is set to be a WLAN system. A channel is an Additive White Gaussian Noise (AWGN) channel, and a number of the transmission antenna is 1. In FIG. 5, the vertical axis is an error rate, and the horizontal axis is a SNR. In FIG. 5, the error rate is used for comparing two methods: a correlation operation (the prior art) and a smoothing filter (the present invention), wherein a filter function used in the present invention is a uniform smoothing filter function and a third-order filter function. As shown in FIG. 5, in the case where the SNR is in the range of −2 to 1 dB, the present invention obtains an error rate lower than that of the prior art. Thus, the present invention provides a better performance.

It should be noted that there are various realizations of the receiving device 20 (including the transferring device 200, the compensating device 210, the processing device 220 and the equalizer 230). For example, the devices mentioned above maybe integrated into one or more devices. In addition, the receiving device 20 may be realized by hardware (e.g., circuit), software, firmware (known as a combination of a hardware device, computer instructions and data that reside as read-only software on the hardware device), an electronic system or a combination of the devices mentioned above, but is not limited herein.

To sum up, the present invention provides a device and a method of performing bandwidth detection, for determining whether subchannels include transmitted data according to input signals and output signals of a filter circuit, to obtain bandwidth information and to process signals early. The present invention effectively improves signal quality and performance. Bandwidth information with a high accuracy is obtained in an environment with a low SNR or a high interference.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A bandwidth detection device, comprising:
   a receiving circuit, for receiving a first plurality of frequency-domain signals on a first subchannel, and for receiving a second plurality of frequency-domain signals on a second subchannel;
   a filter circuit, coupled to the receiving circuit, for transferring the first plurality of frequency-domain signals to a first plurality of filtered frequency-domain signals according to a filter function, and for transferring the second plurality of frequency-domain signals to a second plurality of filtered frequency-domain signals according to the filter function; and
   a processing circuit, coupled to the filter circuit, for comparing the first plurality of frequency-domain signals with the first plurality of filtered frequency-domain signals, to determine whether the first subchannel comprises first transmitted data, and for comparing the second plurality of frequency-domain signals with the second plurality of filtered frequency-domain signals, to determine whether the second subchannel comprises second transmitted data.

2. The bandwidth detection device of claim 1, wherein the processing circuit determines that the first subchannel comprises the first transmitted data when a ratio of a total energy level of the first plurality of frequency-domain signals and a total energy level of the first plurality of filtered frequency-domain signals is not greater a threshold, and the processing circuit determines that the first subchannel does not comprise the first transmitted data when the ratio is greater than the threshold.

3. The bandwidth detection device of claim 1, wherein the first plurality of frequency-domain signals are located in a Legacy Short Training Field (L-STF), a Legacy Long Training Field (L-LTF) or a Legacy Signal Field (L-SIG).

4. The bandwidth detection device of claim 1, wherein the first plurality of frequency-domain signals comprises a plurality of channel estimates of the first subchannel, and the first subchannel occupies a bandwidth.

5. The bandwidth detection device of claim 1, wherein the filter function is a uniform smoothing filter or an exponential smoothing filter.

6. The bandwidth detection device of claim 1, wherein the filter function is a third-order filter function, and all coefficients of the filter function are a plurality of coefficients for a signal-to-noise ratio (SNR) below 60 dB.

7. The bandwidth detection device of claim 1, wherein all coefficients of the filter function are real numbers.

8. The bandwidth detection device of claim 1, wherein a first time instant of determining whether the first subchannel comprises the first transmitted data is earlier than a second time instant of obtaining bandwidth information, and the bandwidth information is comprised in a High Throughput Signal Field, a Very High Throughput Signal Field A or a High Efficiency Signal Field A.

9. The bandwidth detection device of claim 8, wherein the High Throughput Signal Field, the Very High Throughput Signal Field A and the High Efficiency Signal Field A are comprised in a High Throughput Preamble, a Very High Throughput Preamble and a High Efficiency Preamble, respectively.

\* \* \* \* \*